United States Patent

Hums et al.

Patent Number: 6,054,408
Date of Patent: *Apr. 25, 2000

[54] CATALYST FOR REDUCING THE NITROGEN OXIDE CONCENTRATION IN A FLOWING MEDIUM AND METHOD FOR PRODUCING THE CATALYST

[75] Inventors: Erich Hums, Hessdorf; Günther Spitznagel, Erlangen; Klaus Hüttenhofer, Heroldsberg; Peter Fischer, Ködnitz-Kauerndorf; Ronald Neufert, Michelau, all of Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/764,712

[22] Filed: Dec. 2, 1996

Related U.S. Application Data

[63] Continuation of application No. PCT/DE95/00584, May 3, 1995.

[30] Foreign Application Priority Data

May 30, 1994 [DE] Germany ................. 44 18 869

[51] Int. Cl.⁷ .................. B01J 27/053; B01J 23/22
[52] U.S. Cl. .................. 502/217; 423/239.1; 502/309
[58] Field of Search ............... 502/309, 204, 502/209, 248, 202, 47; 423/239.1; 252/261

[56] References Cited

U.S. PATENT DOCUMENTS

| | | | |
|---|---|---|---|
| 4,085,193 | 4/1978 | Nakajima et al. | |
| 4,952,548 | 8/1990 | Kato et al. | |
| 5,045,516 | 9/1991 | Vogel et al. | 502/309 |
| 5,087,600 | 2/1992 | Kato et al. | 502/309 |
| 5,330,953 | 7/1994 | Meina | 502/208 |
| 5,723,404 | 3/1998 | Bütje et al. | 502/309 |

FOREIGN PATENT DOCUMENTS

| | | |
|---|---|---|
| 0 313 755 A2 | 5/1989 | European Pat. Off. |
| 317875 | 5/1989 | European Pat. Off. |
| 385164 | 2/1990 | European Pat. Off. |
| 0 360 548 A1 | 3/1990 | European Pat. Off. |
| 472014 | 7/1991 | European Pat. Off. |
| 24 58 888 | 6/1975 | Germany |
| 28 46 476 | 5/1979 | Germany |
| 35 31 810 A1 | 3/1987 | Germany |
| 38 05 564 A1 | 8/1989 | Germany |
| 43 15 062 A1 | 11/1994 | Germany |

OTHER PUBLICATIONS

Dr. techn. J. Sagoschen, "Platinmetalle als Katalysatoren—Eine Übersicht", Metall 12. JG. Jul. 1958, Heft 7, pp. 604–611, platinum metals as catalysts –an overview.

*Primary Examiner*—Wayne Langel
*Attorney, Agent, or Firm*—Herbert L. Lerner; Laurence A. Greenberg; Werner H. Stemer

[57] ABSTRACT

An SCR catalyst containing titanium, molybdenum and vanadium has the particular characteristic that its catalytic activity is significantly less than that of a tungsten-containing catalyst. That disadvantage has been compensated for in the past by using a comparatively large volume of catalyst. In contrast to the conventional practice of using a molybdenum oxide proportion of about 10 to 12% by weight, the invention proposes that the molybdenum proportion of the catalyst, in the form of molybdenum trioxide $MoO_3$, is about 0.01 to 5% by weight, preferably 1.5 to 4% by weight, relative to the weight of the catalyst mass. A catalyst containing this amount of molybdenum thus has an activity comparable to that of a tungsten-containing catalyst. The invention is applicable to all $deNO_x$ catalytic converters which call for the simultaneous presence of a reducing agent, in particular plate-type and honeycomb-type catalytic converters.

23 Claims, 2 Drawing Sheets

CATALYST FOR REDUCING THE NITROGEN OXIDE CONCENTRATION IN A FLOWING MEDIUM AND METHOD FOR PRODUCING THE CATALYST

CROSS-REFERENCE TO RELATED APPLICATION

This application is a Continuation of International Application PCT/DE95/00584, filed May 3, 1995.

BACKGROUND OF THE INVENTION

Field of the Invention

The invention relates to a catalyst for reducing the nitrogen oxide concentration in a flowing medium, such as waste gas or flue gas of a combustion plant. The invention also relates to a method for the production of such a catalyst.

Due to the proven environmentally damaging effect of nitrogen oxides in the waste gas of a combustion plant, a technology has developed with the goal of catalytically reducing the nitrogen oxides. A method that has gained acceptance is the process known as selective catalytic reduction (SCR method), whereby the nitrogen oxides are contacted together with a suitable reducing agent, usually ammonia $NH_3$, with what is known as a deNO$_x$ catalyst and are catalytically converted into nitrogen and water, which are environmentally safe.

German Patent DE 24 58 888 C, corresponding to U.S. Pat. No. 4,085,193, discloses, among other things, deNO$_x$ catalysts that contain vanadium and molybdenum as well as titanium as the main constituent. It has been proven that a molybdenum-containing catalyst does not attain the catalytic activity of a tungsten-containing catalyst. At present, that disadvantage with respect to activity can only be compensated for by increasing the catalytic volume of the molybdenum-containing catalyst.

Furthermore, it has been shown that the "intimate mixture" of the components of the catalyst, which proved to be of particular significance in German Patent DE 24 58 888 C, corresponding to U.S. Pat. No. 4,085,193, causes the catalyst to become poisoned relative quickly through volatile heavy metals and heavy metal compounds contained in the waste gas to be denitrogenated. The "intimate mixture" by definition excludes chemically stabilized and/or pre-calcined titanium dioxide $TiO_2$ as the starting material for catalysts because, according to U.S. Pat. No. 4,085,193, a sufficient level of catalytic activity cannot be attained, as explained in column 3, lines 59ff of U.S. Pat. No. 4,085,193.

U.S. Pat. No. 4,952,548 discloses a catalyst for reducing nitrogen oxide concentration, which catalyst contains titanium oxide as a first component, molybdenum oxide $MoO_3$ and/or tungsten oxide $WO_3$ as a second component, and vanadium oxide and/or vanadium sulfate as a third component. A lower limit specified for the content of the second component is 3 atom %. With a molecular weight of 144 g for $MoO_3$ and 96 g for $TiO_2$, the proportion of $MoO_3$ for the lower limit is therefore approximately 5% by weight. At present, a content of approximately 10 to 12% by weight, calculated as $MoO_3$, has proven to be the most suitable molybdenum proportion for such a catalyst. It has been proven that the catalytic activity of a titanium-molybdenum-vanadium catalyst having the atomic ratios given in U.S. Pat. No. 4,952,548 is still below the catalytic activity of a commercially available titanium-tungsten-vanadium catalyst.

German Published, Non-Prosecuted Patent Application DE 35 31 810 A1 discloses a catalyst material for reducing nitrogen oxides, which material is created in a grinding step of titanium oxide in a calcined anatase modification, with an admixture of vanadium oxide and possibly molybdenum oxide. By partially substituting phosphorous, the sum of the active components vanadium oxide and molybdenum oxide lies at a volume of less than 1 atom % with respect to titanium. The catalytic activity is attained in this case not merely by mixing the substances but through the use of a grinding process which gives rise to a catalytically effective compound that differs from a mixture alone.

Published European Patent Application 0 313 755 A2 also discloses a molybdenum and vanadium-containing catalyst based on titanium oxide for the removal of nitrogen oxides. The concentration of molybdenum and vanadium contained in the catalyst through impregnation with a dissolved molybdenum and vanadium compound, calculated as $MoO_3$ and $V_2O_5$, is 5 to 15% by weight and 0.1 to 3.0% by weight, respectively.

Furthermore, for the production of such Ti/Mo/V catalysts, Published European Patent Application 0 360 548 A1, corresponding to U.S. Pat. No. 5,166,122, discloses a process whereby ammonium molybdate and ammonium metavanadate are mixed with metatitanium acid in water to form a kneadable mass, this mass is granulated, dried, calcined at 550° C. and ground to a powder. The powder which is thereby obtained is mixed with water to form a slurry, into which a metal support is lowered so as to be coated. This is followed by further calcination at 500° C.

Additionally, German Published, Non-Prosecuted Patent Application DE 28 46 476 A1, corresponding to U.S. Pat. No. 4,207,209, discloses a process for the production of a titanium dioxide-containing sintered product for catalytic removal of pollutants, whereby titanium dioxide is directly mixed and kneaded with ammonium vanadate and ammonium molybdate to form an aqueous slurry. The resulting mixture is dried, pulverized and pre-calcined, whereby the pre-calcination serves to deposit molybdenum oxide on the powder-type titanium dioxide, in order to achieve a high level of effectiveness. The pre-calcined material is then mixed again with water and kneaded into a viscous mass. The mass is shaped into the desired structures and then calcined.

SUMMARY OF THE INVENTION

It is accordingly an object of the invention to provide a catalyst for reducing the nitrogen oxide concentration in a flowing medium and a method for producing the catalyst, which overcome the hereinafore-mentioned disadvantages of the heretofore-known products and methods of this general type and in which the catalyst contains titanium, molybdenum and vanadium and attains a catalytic activity comparable to that of a tungsten-containing catalyst.

With the foregoing and other objects in view there is provided, in accordance with the invention, a catalyst for reducing the nitrogen oxide concentration in a flowing medium, comprising a catalyst mass including titanium, molybdenum and vanadium in the form of their oxides, containing a proportion of molybdenum trioxide $MoO_3$ of from 0.01 to less than 5% by weight, preferably 1.5 to 4% by weight, and a proportion of vanadium pentoxide $V_2O_5$ of from 0.01 to 5% by weight, preferably 0.5 to 2.0% by weight, relative to the weight of the catalyst mass, and titanium contained in the form of stabilized titanium dioxide $TiO_2$ of the anatase type.

With the objects of the invention in view there is also provided a method for the production of a catalyst for reducing the nitrogen oxide concentration in a flowing medium, which comprises adding a dispersing agent, such as water, to chemically stabilized titanium dioxide $TiO_2$ of the anatase type to yield a kneadable mass; adding water-soluble compounds of molybdenum and vanadium and possibly other auxiliary materials to the mass and further kneading the mass to form a catalyst mass; then coating supporting bodies with the catalyst mass or extruding honeycomb-type bodies from the catalyst mass or granulating the catalyst mass to form granulates or pelletizing the catalyst mass into pellets; and drying and calcining the coated supporting bodies or honeycomb-type bodies or granulates or pellets at a temperature of 400 to 700° C., preferably 500 to 600° C. for several hours, preferably 2 to 4 hours.

The molybdenum-containing catalyst which is prepared in this manner for reducing the $NO_x$ concentration displays a particularly high level of catalytic activity. Surprisingly, this effect is achieved through the fact, among others, that the molybdenum content is particularly low. Furthermore, it now appears, surprisingly, that a catalyst in accordance with the invention having the same catalytic activity as a tungsten-containing catalyst is, in addition, considerably more resistant to poisoning by arsenic oxide, and can therefore be used preferably in power plants downstream of melting-chamber furnaces. Chemically stabilized titanium dioxide is titanium dioxide that displays the X-ray reflexes that are specific to the titanium dioxide lattice in an X-ray diffractometry. Such stabilized titanium dioxide is attained, for example, as an end product of sulfate processing.

In accordance with another feature of the invention, with reference to the surface structure of a catalyst built primarily on the basis of titanium oxide, it is advantageous if the proportion of titanium oxide of the rutile type is less than 5% by weight, preferably less than 1% by weight, with respect to the overall volume of titanium dioxide $TiO_2$. Titanium dioxide of the anatase type gives rise to a high specific surface area and a high level of activity in a simple manner, while titanium dioxide of the rutile type has a lower specific surface area due to the different crystal lattice.

The catalyst can have one or more of the characteristics specified below, which make the catalyst particularly resistant to poisoning by arsenic and arsenic-oxygen compounds.

In accordance with a further feature of the invention, the impurities in the titanium dioxide of sodium Na, potassium K and iron Fe can be selected to be less than 500 ppm in each case, preferably less than 100 ppm.

In accordance with an added feature of the invention, in addition, the proportion of phosphorous P in the titanium dioxide $TiO_2$ can be less than 0.5% by weight, preferably less than 0.2% by weight.

In accordance with an additional feature of the invention, in addition, the proportion of sulfur, calculated as sulfates $SO_4$, in the titanium dioxide $TiO_2$ can be between 0 and 3% by weight and preferably approximately 1 to 2% by weight.

In accordance with yet another feature of the invention, a surface structure that is advantageous for the catalytic conversion of the nitrogen oxides is attained if the specific surface area of the titanium dioxide $TiO_2$ is between 40 and 180 m$^2$/g and preferably between 70 and 130 m$^2$/g.

Other features which are considered as characteristic for the invention are set forth in the appended claims.

Although the invention is illustrated and described herein as embodied in a catalyst for reducing the nitrogen oxide concentration in a flowing medium and a method for producing the catalyst, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
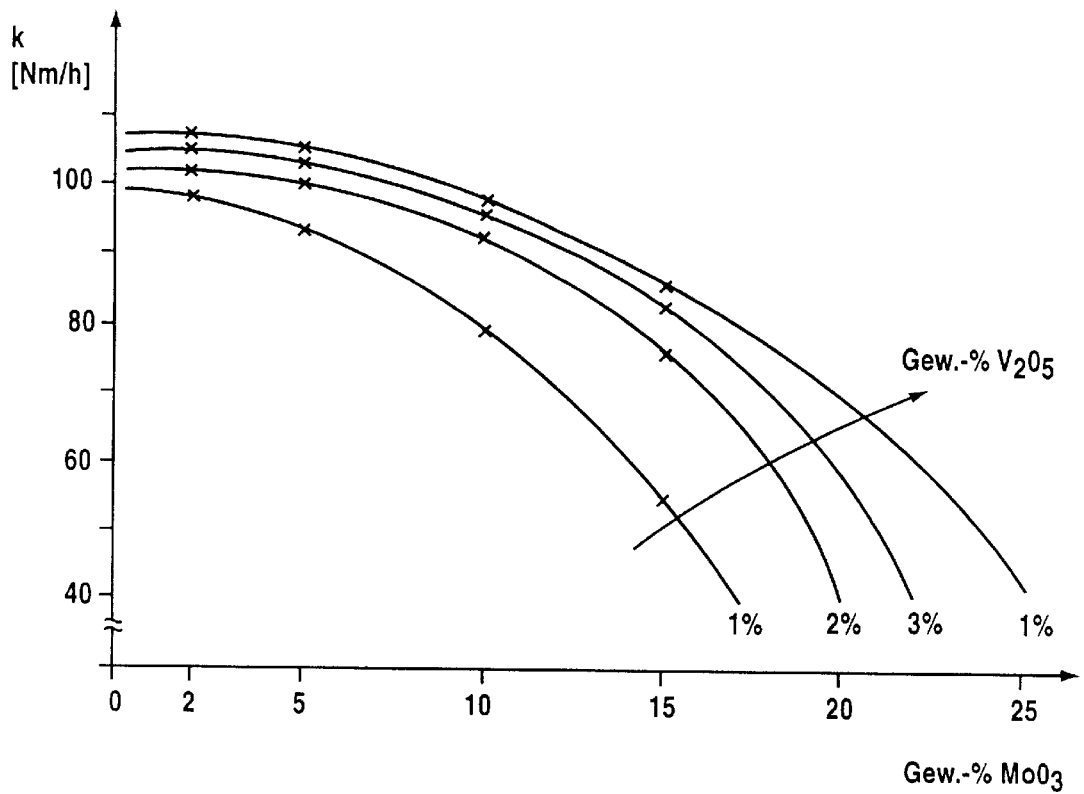
FIG. 1 is a graph showing catalytic activity k of a catalytic mass as a function of molybdenum trioxide proportion for various concentrations of vanadium pentoxide.

Referring now to the figures of the drawings in detail and first, particularly, to FIG. 1 thereof, there is seen a graph of catalytic activity k given in standard meters per hour (Nm/h), of a catalyst mass or composition, as a function of molybdenum trioxide proportion given in % by weight $MoO_3$, for various proportions of vanadium pentoxide $V_2O_5$. It can be seen that the maximum catalytic activity is reached with a molybdenum trioxide proportion of only approximately 2% by weight, with respect to the weight of the catalyst mass. The catalytic activity is thereby dependent to a lesser extent on the proportion of vanadium pentoxide, which is 4% by weight according to illustrated curves 1, 2 and 3 and is dependent to a greater extent on the relatively low proportion of molybdenum trioxide $MoO_3$.

Figure 3:
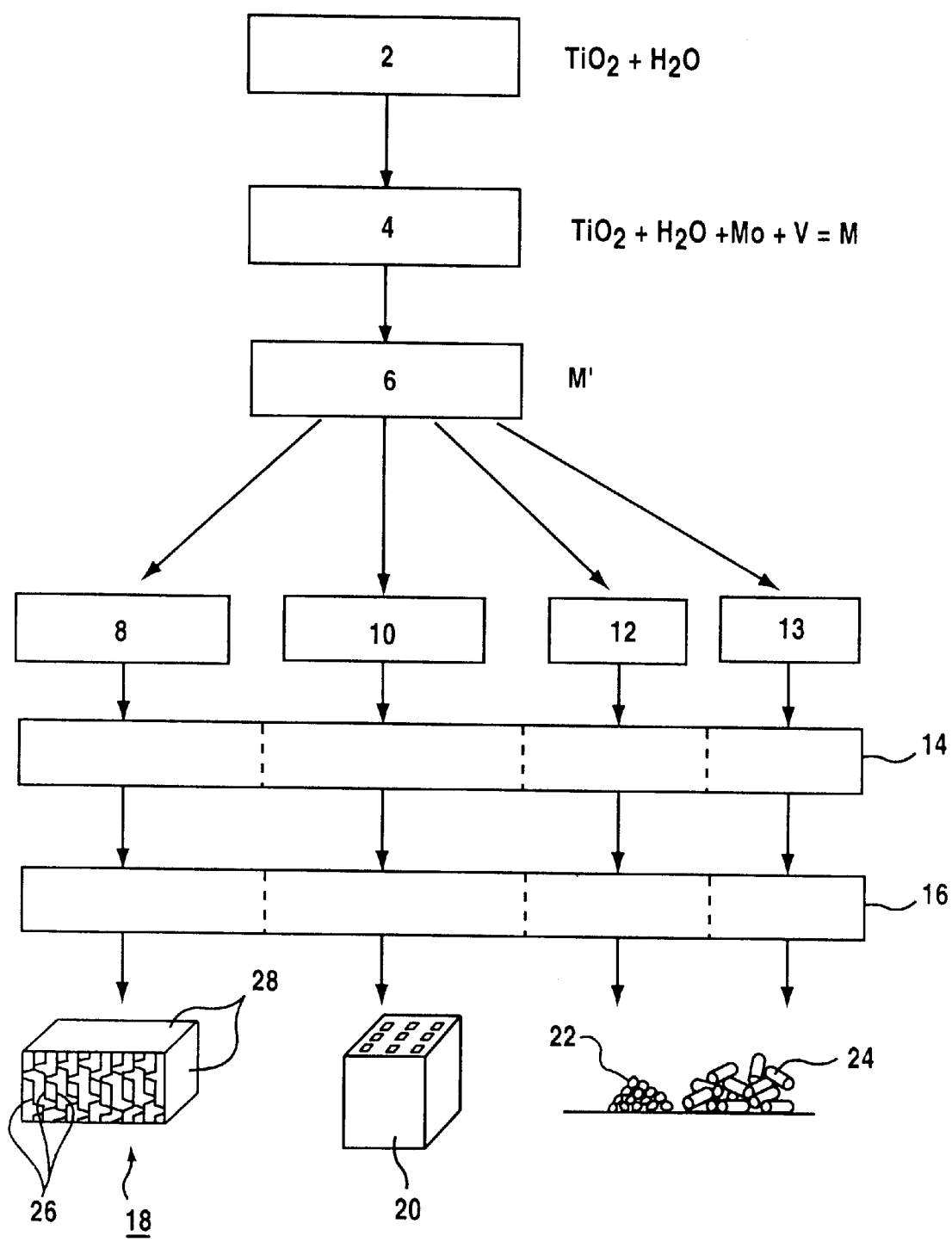
FIG. 3 is a flow chart of a production process for a catalyst shown diagrammatically as end products.

The catalysts for reducing the nitrogen oxide concentration, which were used for measuring the data shown in FIG. 1, were manufactured basically in accordance with FIG. 3:

A starting material chosen for a process step 2 is chemically stabilized titanium dioxide of the anatase type, with a rutile proportion of less than 5% by weight and preferably less than 1% by weight. Furthermore, the proportion of the impurities sodium, present as disodium oxide $Na_2O$, potassium, present as dipotasium oxide $K_2O$, and iron Fe as an oxide in each case is approximately 0.2% by weight or less. The proportion of sulfur, present as sulfates $SO_4$, is between 0 and 3% by weight and preferably approximately 1 to 2% by weight.

During the process step 2, water is added to the titanium dioxide to form a kneadable mass or composition, to which water-soluble compounds of molybdenum and vanadium, such as ammonium heptamolybdate and ammonium metavanadate, for example, are then added in accordance with intended concentrations, to form a mass M in a process step 4. This mass M is kneaded.

After the desired water content of the mass M has been set, inorganic minerals, such as clays and/or fiber materials such as glass fibers, for example, are added to the mass M in a process step 6 to increase its mechanical strength. During the same process step 6, other additives, such as film forming agents, dispersing agents, thickening agents and the like, can also be added to the kneaded mass. The resulting mass is kneaded again to form a catalyst mass M'.

In process steps 8, 10, 12 and 13, this catalyst mass M' is rolled onto a supporting body, such as an expanded metal, or extruded into a honeycomb-type body 20 or shaped into granulates 22 or pellets 24.

After the catalyst mass M' has been shaped, all embodiments (plate, honeycomb, granulates, pellets) are dried in a process step 14 that is identical for all embodiments and then calcined in a process step 16, which is also identical for all embodiments, at a temperature of approximately 500° C. for several hours (approximately 2 to 4 hours). This relatively low calcination temperature inhibits the growth of pores, in such a way that a catalyst mass structure having a relatively high specific area is formed.

Coated supporting bodies 26 are installed, e.g. inserted, in an element box or housing 28, forming a plate-type catalyst supporting body 18.

As an alternative to metallic supporting bodies and to rolling on the catalyst mass M', it would also be possible to impregnate inert supporting bodies, such as aluminum oxide, zirconia, cordierite, etc., with a catalyst mass suspended in water and including water, titanium dioxide, ammonia heptamolybdate and ammonia metavanadate. Upon calcination, the ammonia compounds of the molybdenum and of the vanadium are converted into oxidic compounds, such as $MoO_3$ and $V_2O_5$, for example.

Figure 2:
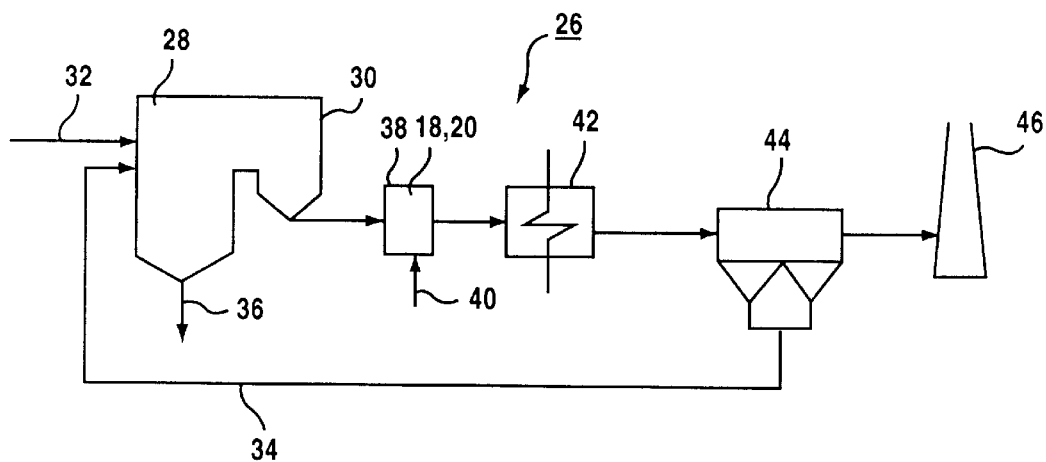
FIG. 2 is a schematic circuit diagram of an incineration plant having an ash recirculation line.

FIG. 2 shows a schematic diagram of a combustion plant 26 having a furnace boiler or firebox 28 with a steam generator 30 connected downstream thereof. A coal supply line 32 and an ash return line 34 are connected to an inlet side of the boiler 28. A slag removal line 36 is connected on an outlet side. Flue gas which is formed in the boiler 28 as the coal is combusted transfers most of its thermal energy in the steam generator 30 to a non-illustrated heat transport medium, such as water, and then flows into a $deNO_x$ reactor 38. Within this $deNO_x$ reactor 38 are plate-type catalyst supporting bodies 18 and/or honeycomb-type catalyst supporting bodies 20, having the previously described catalyst mass. A reducing agent required for selective reduction of the nitrogen oxides contained in the flue gas, in this case ammonia, is added to the flue gas through an ammonia supply line 40 before the flue gas is contacted with the respective honeycomb-type or plate-type catalyst supporting body 20 or 18. As a result of the contacting of the nitrogen oxides and the ammonia over the catalyst, these two starting materials are converted into nitrogen and water. Downstream of the $deNO_x$ reactor 38, the flue gas, which is then largely free of nitrogen oxides, flows through an air preheater 42, a filter system 44 and a stack 46. Dust which is separated from the flue gas in the filter system 44 is returned to the boiler 28 through the ash recirculation line 34.

As a result of the ash recirculation and the utilization of coal as a fuel in this case, the flue gas resulting from the combustion also has a significant proportion of volatile heavy metal compounds. These are mainly oxygen compounds of lead, selenium, arsenic, cadmium and zinc. These compounds also precipitate onto the catalytically active surfaces of the catalyst support bodies 18, 20 in the $deNO_x$ reactor 38 and can poison and thereby deactivate the catalyst mass located there. Due to the previously described characteristics of the catalyst mass, poisoning and deactivation of the catalyst support bodies 18, 20 in the $deNO_x$ reactor 38 is a very slow process in this case.

We claim:

1. A catalyst for reducing the nitrogen oxide concentration in a flowing medium, comprising:
   a catalyst mass without rutilizing inhibitors, said catalyst mass including titanium, molybdenum and vanadium in the form of their oxides, containing an overall proportion of molybdenum trioxide $MoO_3$ of from 0.01 to less than 5% by weight and a proportion of vanadium pentoxide $V_2O_5$ of from 0.01 to 5% by weight, relative to the weight of the catalyst mass, and titanium dioxide $TiO_2$ primarily in the form of chemically stabilized titanium dioxide $TiO_2$ of the anatase type, and a proportion of titanium dioxide $TiO_2$ of the rutile type of less than 5% by weight relative to an overall volume of said titanium dioxide $TiO_2$;
   said titanium dioxide $TiO_2$ containing impurities of sodium Na, potassium K, and iron Fe each of less than 500 ppm.

2. The catalyst according to claim 1, wherein the proportion of molybdenum trioxide $MoO_3$ is 1.5 to 4% by weight.

3. The catalyst according to claim 1, wherein the proportion of vanadium pentoxide $V_2O_5$ is 0.5 to 2.0% by weight.

4. The catalyst according to claim 1, wherein the proportion of titanium dioxide $TiO_2$ of the rutile type is less than 1% by weight.

5. The catalyst according to claim 1, wherein the impurities of sodium Na, potassium K and iron Fe are each less than 100 ppm.

6. The catalyst according to claim 1, wherein the titanium dioxide $TiO_2$ contains a proportion of phosphorous P of less than 0.5% by weight.

7. The catalyst according to claim 6, wherein the proportion of phosphorous P in the titanium dioxide $TiO_2$ is less than 0.2% by weight.

8. The catalyst according to claim 1, wherein the titanium dioxide $TiO_2$ contains a proportion of sulfur, calculated as sulfate $SO_4$, of between 0 and 3% by weight.

9. The catalyst according to claim 8, wherein the proportion of sulfate $SO_4$ in the titanium dioxide $TiO_2$ is between 1 and 2% by weight.

10. The catalyst according to claim 1, wherein the titanium dioxide $TiO_2$ has a specific surface area of between 40 and 180 $m^2/g$.

11. The catalyst according to claim 10, wherein the specific surface area of the titanium dioxide $TiO_2$ is between 70 and 130 $m^2/g$.

12. A method for the production of a catalyst for reducing the nitrogen oxide concentration in a flowing medium, which comprises:
   a) adding a dispersing agent to chemically stabilized titanium dioxide $TiO_2$ of the anatase type to yield a kneadable mass, the titanium dioxide $TiO_2$ containing impurities of sodium Na, potassium K, and iron Fe each of less than 500 ppm but containing no rutilizing inhibitors;
   b) adding water-soluble compounds of molybdenum and vanadium to the mass and further kneading the mass to form a catalyst mass to yield a proportion of molybdenum trioxide $MoO_3$ of from 0.01 to less than 5% by weight and a proportion of vanadium pentoxide $V_2O_5$ of from 0.01 to 5% by weight, relative to the weight of the catalyst mass;
   c) then coating supporting bodies with the catalyst mass; and
   d) drying and calcining the coated supporting bodies at a temperature of 400 to 700° C. or 2 to 4 hours.

13. The method according to claim 12, which comprises adding water as the dispersing agent.

14. The method according to claim 12, which comprises performing the calcining step at a temperature of 500 to 600° C.

15. A method for the production of a catalyst for reducing the nitrogen oxide concentration in a flowing medium, which comprises:

a) adding a dispersing agent to chemically stabilized titanium dioxide $TiO_2$ of the anatase type to yield a kneadable mass, the titanium dioxide $TiO_2$ containing impurities of sodium Na, potassium K, and iron Fe each of less than 500 ppm but containing no rutilizing inhibitors;

b) adding water-soluble compounds of molybdenum and vanadium to the mass and further kneading the mass to form a catalyst mass to yield a proportion of molybdenum trioxide $MoO_3$ of from 0.01 to less than 5% by weight and a proportion of vanadium pentoxide $V_2O_5$ of from 0.01 to 5% by weight, relative to the weight of the catalyst mass;

c) then extruding honeycomb-type bodies from the catalyst mass; and d) drying and calcining the honeycomb-type bodies at a temperature of 400 to 700° C. for 2 to 4 hours.

16. The method according to claim 15, which comprises adding water as the dispersing agent.

17. The method according to claim 15, which comprises performing the calcining step at a temperature of 500 to 600° C.

18. A method for the production of a catalyst for reducing the nitrogen oxide concentration in a flowing medium, which comprises:

a) adding a dispersing agent to chemically stabilized titanium dioxide $TiO_2$ of the anatase type to yield a kneadable mass, the titanium dioxide $TiO_2$ containing impurities of sodium Na, potassium K, and iron Fe each of less than 500 ppm but containing no rutilizing inhibitors;

b) adding water-soluble compounds of molybdenum and vanadium to the mass and further kneading the mass to form a catalyst mass to yield a proportion of molybdenum trioxide $MoO_3$ of from 0.01 to less than 5% by weight and a proportion of vanadium pentoxide $V_2O_5$ of from 0.01 to 5% by weight, relative to the weight of the catalyst mass;

c) then granulating the catalyst mass to form granulates; and d) drying and calcining the granulates at a temperature of 400 to 700° C. for 2 to 4 hours.

19. The method according to claim 18, which comprises adding water as the dispersing agent.

20. The method according to claim 18, which comprises performing the calcining step at a temperature of 500 to 600° C.

21. A method for the production of a catalyst for reducing the nitrogen oxide concentration in a flowing medium, which comprises:

a) adding a dispersing agent to chemically stabilized titanium dioxide $TiO_2$ of the anatase type to yield a kneadable mass, the titanium dioxide $TiO_2$ containing impurities of sodium Na, potassium K, and iron Fe each of less than 500 ppm but containing no rutilizing inhibitors;

b) adding water-soluble compounds of molybdenum and vanadium to the mass and further kneading the mass to form a catalyst mass to yield a proportion of molybdenum trioxide $MoO_3$ of from 0.01 to less than 5% by weight and a proportion of vanadium pentoxide $V_2O_5$ of from 0.01 to 5% by weight, relative to the weight of the catalyst mass;

c) then pelletizing the catalyst mass into pellets; and d) drying and calcining the pellets at a temperature of 400 to 700° C. for 2 to 4 hours.

22. The method according to claim 21, which comprises adding water as the dispersing agent.

23. The method according to claim 21, which comprises performing the calcining step at a temperature of 500 to 600° C.

* * * * *